(12) United States Patent
Ijspeert

(10) Patent No.: US 6,796,336 B1
(45) Date of Patent: Sep. 28, 2004

(54) DIAPHRAGM SYSTEM

(75) Inventor: Albert Jan Ijspeert, Aire (CH)

(73) Assignee: European Organisation for Nuclear Research-CERN, Geneva (CH)

( * ) Notice: Subject to any disclaimer, the term of this patent is extended or adjusted under 35 U.S.C. 154(b) by 41 days.

(21) Appl. No.: 10/111,063

(22) PCT Filed: Oct. 20, 2000

(86) PCT No.: PCT/IB00/01677
§ 371 (c)(1),
(2), (4) Date: Sep. 9, 2002

(87) PCT Pub. No.: WO01/29471
PCT Pub. Date: Apr. 26, 2001

(30) Foreign Application Priority Data

Oct. 21, 1999 (EP) .............................. 99121051

(51) Int. Cl.[7] .............................. F16L 55/00
(52) U.S. Cl. .................. 138/108; 138/112; 138/113; 138/148; 138/DIG. 11
(58) Field of Search .................. 138/108, 43, 112, 138/113, 148, DIG. 11; 248/550, 562, 568, 570, 580, 602, 603, 614, 49

(56) References Cited

U.S. PATENT DOCUMENTS

| | | | | |
|---|---|---|---|---|
| 3,417,785 A | * | 12/1968 | Andrews .................. | 138/108 |
| 3,650,579 A | | 3/1972 | Sable | |
| 4,056,679 A | * | 11/1977 | Brandt et al. .............. | 174/13 |
| 4,250,927 A | | 2/1981 | Newburg | |
| 5,018,260 A | * | 5/1991 | Ziu .......................... | 24/555 |
| 5,404,914 A | * | 4/1995 | Ziu .......................... | 138/113 |
| 5,416,281 A | * | 5/1995 | Ogura ....................... | 181/106 |
| 5,482,088 A | * | 1/1996 | Ziu .......................... | 138/113 |
| 5,538,043 A | * | 7/1996 | Salazar ..................... | 138/26 |
| 5,570,723 A | * | 11/1996 | Hwang et al. ............. | 138/111 |
| 5,709,248 A | * | 1/1998 | Goloff ...................... | 138/30 |
| 5,749,398 A | * | 5/1998 | Kambara ................... | 138/113 |
| 5,803,127 A | * | 9/1998 | Rains ....................... | 138/113 |
| 6,390,131 B1 | * | 5/2002 | Kilgore ..................... | 138/30 |

FOREIGN PATENT DOCUMENTS

| | | |
|---|---|---|
| EP | 0 399 123 | 11/1990 |
| WO | WO 97/12169 | 4/1997 |

OTHER PUBLICATIONS

Ijspeert et al, "Superconducting Coil Compression By Scissor Laminations", Conference Paper, *European Particle Accelerator Conference*, Jun. 1996.

* cited by examiner

*Primary Examiner*—James Hook
(74) *Attorney, Agent, or Firm*—Schiff Hardin LLP

(57) ABSTRACT

A diaphragm system to center and hold at least one inner body within an outer body, which inner body and outer body extend in a first direction, has a plurality of washers positioned between an inner surface of the outer body and has a recess or aperture for receiving each of the inner bodies. The washers have an outer circumference provided with a surface contact portion for engaging an inner surface of the outer body, and each of the recesses has a surface contact portion for engaging an outer surface of the inner body with the contact portion for engaging the outer body and the contact portion for engaging each of the inner bodies having an angular extent up to 180°. The washers are mounted at different angular orientations perpendicular to the first direction regarding their contact portions, so that pressure is applied uniformly around each of the inner bodies.

17 Claims, 2 Drawing Sheets

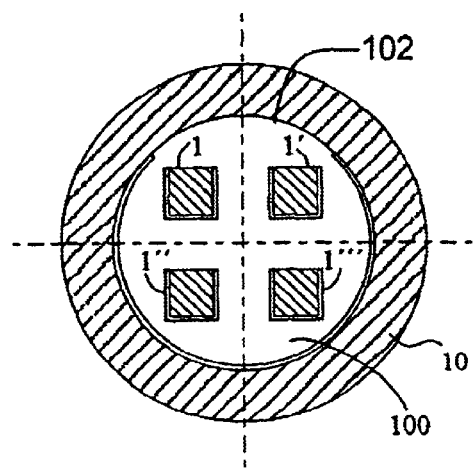
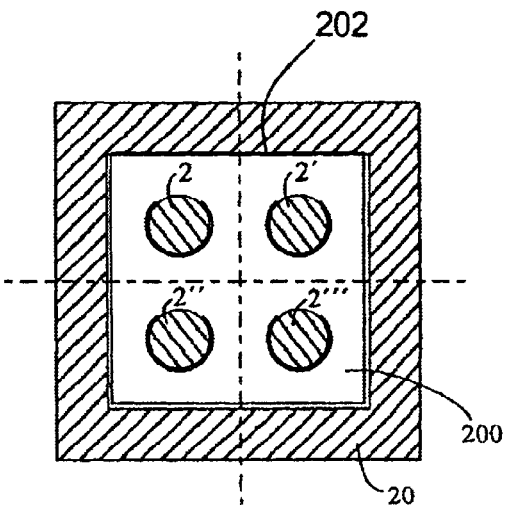
Fig. 1a
Fig. 2a
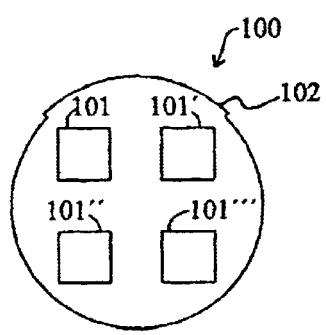
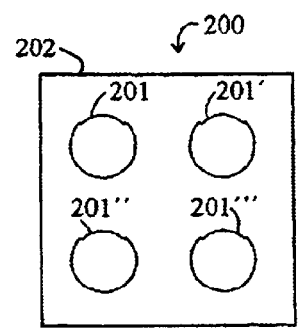
Fig. 1b
Fig. 2b

DIAPHRAGM SYSTEM

BACKGROUND OF THE INVENTION

The present invention refers to a diaphragm system to position and hold at least one inner body within an outer body.

Until now, several systems have been proposed for centering and holding an inner cylindrical body within an outer cylindrical body. For example, the company Ringspann, Schaberweg 32, 61348 Bad Homburg, Germany, offers slightly conical discs which are stacked in packages between, for example, an axis and a wheel, and are pressed together in order to create a force between the wheel and the axis.

EP 0 399 123 A1 discloses resilient support clips which support legs for double-containment thermoplastics pipe assemblies.

In addition, ring-shaped laminations stacked around magnet coils in order to compress super-conducting magnets for accelerators have been developed on behalf of the applicant, see, for example, "Superconducting Coil Compressing by Scissor Laminations", published as conference paper of "European Particle Accelerator Conference", Jun. 10 to 14, 1996, at Sitges, Spain. The laminations have the peculiarity that the circular periphery is designed to be slightly off-center as compared to the magnet center and are mounted with different angular orientations.

A generic system is known from WO 97/12169, which discloses a coupling assembly for first and second multi-duct conduits. The assembly comprises a pair of end caps, each of which has apertures for receiving a respective duct of one of the first and second conduits, and a mounting portion arranged adjacent each aperture. A plurality of open-ended tubular members, each of which has an internal bore for receiving a duct of the first and second conduits, are arranged parallel to each other between the end caps, and the end caps are mounted via the mounting portions to the end of the tubular members so that the apertures of the end caps are aligned with respective bores of the tubular members.

The known systems have the drawback that they are only applicable to cylindrical inner as well as outer bodies, restricting the field of appliances.

SUMMARY OF THE INVENTION

It is, therefore, the object of the present invention to further develop the known diaphragm system to overcome the drawbacks of the prior art and particularly provide a generic system also applicable for non-cylindrical-shaped inner and/or outer bodies.

This object is achieved by a diaphragm system to position and hold at least one inner body within an outer body characterized by a plurality of washers between the at least one inner body and the outer body, the extension of the at least one inner body and the outer body defining a first direction, at least one of the at least one inner body and outer body having a cross-section perpendicular to said first direction of a non-cylindrical shape, all washers having the same shape, each washer having a recess or opening for each inner body, each washer having an outer circumference contacting the outer body with at least one respective contact portion of the circumference extending about an angular range amounting up to 180° perpendicular to the first direction, and the washers being mounted with different relative angular orientations perpendicular to the first direction regarding their contact portions.

With the invention, it is especially proposed that the at least one inner body, the outer body or both have a cross-section perpendicular to said first direction of a symmetrical shape.

According to the invention, it is preferred that each washer contacts an outer surface of each inner body over an angular range amounting up to 180° perpendicular to the first direction along at least one contact portion.

One special embodiment of the invention is characterized in that several inner bodies, each having the same cross-section perpendicular to the first direction, are arranged parallel to each other in the first direction in a regular angular pattern, with the washers being mountable in different angular orientations and/or upside down to each other.

In addition, with the invention, it is proposed that the contact portions of the washers provide for one point contacts, several point contacts and/or line contacts.

Another development in line with the invention is characterized in that adjacent washers are pivoted around an axis parallel to the first direction and/or perpendicular to the first direction, and are preferably turned upside down, relative to each other, for positioning the at least one inner body within the outer body and enabling a transmission of force from the outer body to the at least one inner body in a plurality of directions.

According to the invention, it is preferred that the washers are mounted in pairs with opposite angular orientations in order to balance opposing forces.

Still further, it is proposed by the invention that the washers or pairs of washers are mounted in at least one sequence with respect to the angular orientation of their contact portions. Preferably, in one sequence, adjacent washers or the first and/or second washer of adjacent pairs of washers all have an equal angular displacement relative to each other. Most preferably, the first washer and the last washer of the sequence have the same angular displacement relative to each other as adjacent washers and the first and/or second washer of adjacent pairs of washers, respectively.

The sequence can be adjustable to create a selected positioning force and/or to direct a force in a certain direction or place according to the invention.

It is preferred in line with the invention that adjacent washers touch each other without being pressed together in the first direction or have a play between each other, depending on the thickness of the washers in the first direction.

Each washer can have at least one additional hole and/or cut-out.

In addition, the washers of the invention can be arranged in groups, with the groups being spaced from each other.

Finally, it is suggested with the invention that the material of the washers is selected to have a certain thermal expansion resulting in a certain stress applied to the at least one inner body, which stress is dependent on the temperature.

It is, therefore, the astonishing perception of the present invention that, for example, a non-cylindrical inner body can be positioned within a cylindrical outer body, a cylindrical inner body can be positioned within a non-cylindrical outer body or a non-cylindrical inner body can be positioned within a non-cylindrical outer body by using a plurality of washers with identical shapes. Each washer is suited for transmitting a force in at least one direction, perpendicular to the direction of extension of the inner and outer bodies, from the outer body to the inner body, and the washers are displaced with respect to each other in order to obtain a positioning, a local centering action and/or a force transmission. In particular, each washer must have only one outer circumference contact portion, with an angular range of up to 180°, to contact the outer body, for transmitting a force, and the respective contact portions create one-point contacts, several-point contacts and/or line contacts. In addition, for facilitating the mounting of the washers on the inner body or bodies, it is also preferred that the washers contact portions are the same only over an angular range of up to 180°. The remaining circumference portions of the washers can be of any shape such that the washers even need not to be closed perpendicular to said direction of extension, rather can be arc-shaped or the like. Due to the fact that the washers each only have to transmit forces in one direction, they need to be mounted under different angular orientations to obtain a positioning action. This structure also enables that a centripetal force is transferred from the outer body through the diaphragm system of the invention to the inner body or bodies so that it can be used to (pre)compress the inner body or bodies.

It is preferred to mount the washers in pairs to balance opposing forces and even to mount said pairs in sequences so that the relative angular displacement between the first washer of adjacent pairs as well as the first and last pair is identical. The sequences can be repeated as many times as necessary to create the desired overall positioning force or to direct the force in a certain direction.

For thin washers, it is preferred that they are packed sufficiently close to avoid them from tipping over. Centric compression forces will actually try to make the washers tilt and, as a result, lose the pressure. However, this movement can be stopped by closely packing the washers, especially as washers with different angular orientations tend to tilt in different directions. The washers may touch each other, but should not be compressed together too strongly in order to allow the washers to slide during a build up of pressure.

When thick washers are used, each washer will have a stable seat and no tendency to tip over. Therefore, thick washers can be spaced apart from each other.

It is preferred to stack washers in groups. Further, additional holes and/or cut-outs can be provided within each washer, for example, for allowing a gas or liquid flow through the diaphragm system or to reduce the weight thereof.

The washers can be made of any material, depending on the concrete application. In case the diaphragm system is used for pre-pressing magnets, the washers are preferably made of magnetic iron; in case the diaphragm system is used with heat exchangers, the washers are preferably made of copper or aluminum; and in case the diaphragm system is used within multi-pin connectors, the washers can be made of isolating plastics or ceramics.

The invention, together with further objects and advantages, may best be understood with reference to the following description taken in conjunction with the accompanying drawings.

BRIEF DESCRIPTION OF THE DRAWINGS

FIG. 1a is a cross-sectional view of four non-cylindrical inner bodies positioned within a cylindrical outer body via a diaphragm system of the invention;

FIG. 1b is a front elevational view of a washer of the diaphragm system of FIG. 1a;

FIG. 2a is a cross-sectional view of four cylindrical inner bodies positioned within a non-cylindrical outer body via another diaphragm system of the invention;

FIG. 2b is a front elevational view of a washer of the diaphragm system of FIG. 2a; and FIG. 3 is a longitudinal section of the diaphragm system of FIG. 1a.

DESCRIPTION OF THE PREFERRED EMBODIMENTS

Figure 3:
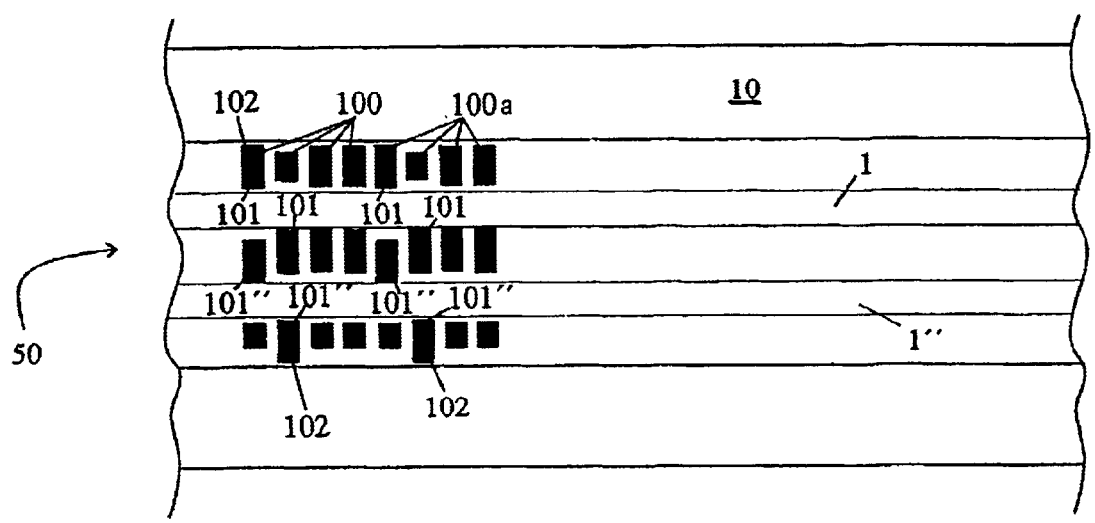

In FIGS. 1a, 1b and 3, the positioning off our inner bodies 1, 1', 1" and 1'", having a square cross-section perpendicular to the direction of extension thereof, within a cylindrical outer body 10 with the help of a plurality of washers 100 of a diaphragm system of the invention is illustrated. Each washer 100 comprises an outer circumference with one contact portion 102 for touching the inner circumference or surface of the outer body 10 and four recesses or apertures, one for each inner body 1, 1', 1" and 1'", with one contact portion 101, 101', 101", 101'" for each inner body 1, 1', 1", 1'".

FIGS. 2a and 2b show an alternative diaphragm system of the invention for positioning four cylindrical inner bodies 2, 2', 2", 2'" within an outer body 20, having a square cross-section perpendicular to the direction of extension thereof, with a plurality of washers 200. Each washer 200 has a contact portion 202 for contacting the inner circumference or surface of the outer body 20 and four apertures or recesses with contact portions 201, 201', 201", 201'" for contacting the outer circumferences of each of the inner bodies 2, 2', 2", 2'".

Both depicted alternatives clearly show that the contact portions 102, 202 allow for contacting the outer body 10, 20 only over an angular range of 90° in order to create a line contact permitting the transmission of forces from the outer body 10, 20 to the inner bodies 1, 1', 1", 1'", 2, 2', 2", 2'". In addition, in order to facilitate mounting of the washers 100, 200, the recesses or apertures for the inner bodies 1, 1', 1", 1'", 2, 2', 2", 2'" also only allow for contacting each inner body 1, 1', 1", 1'", 2, 2', 2", 2'" over an angular range of 90° via the contact portions 101, 101', 101", 101'" and 201, 201', 201", 201'".

As shown in FIG. 3, the diaphragm system 50 of the invention comprises a plurality of washers 100 mounted on the inner bodies 1, 1', 1", 1'" in pairs and in a certain sequence so that the relative angular displacement, from the left to the right in FIG. 3, is 0°, 180°, 90°, 270°, and this sequence is repeated once with the washers of the second sequence being upside down and indicated by 100a.

In summary, the washers 100, 200 of the invention have distinct contact portions 101 to 102, 201 to 202, each extending over an angular range of less than 180°, the washers 100, 200 being placed in different angular orientations of their contact portions 101 to 102, 201 to 202 in order to achieve a perfect positioning and holding. In the case of thin washers 100, they are also closely packed and arranged in groups, one group being shown in FIG. 3. Thus, the washers of the invention need not be extremely precise in shape as they are all identical and placed with different angular orientations, reducing fabrications costs.

Although modifications and changes may be suggested by those skilled in the art, it is the intention of the applicant to embody within the patent warranted hereon all changes and modifications as reasonably and probably come within the scope of its contribution to the art. The features of the present invention, which are believed to be novel, are set forth in detail in the appended claims.

I claim:

1. A diaphragm system for positioning and holding at least one inner body within an outer body, each inner body and the outer body extending in a first direction, said system comprising a plurality of washers between the at least one inner body and the outer body, one of the at least one inner body and the outer body having a cross-section perpendicular to the first direction of a non-cylindrical shape, all of the washers having the same shape, each washer having a recess for each inner body, each washer having an outer circumference with at least one contact portion for contacting an inner surface of the outer body over an angular range up to 180° perpendicular to the first direction, the washers being mounted with different relative angular orientation perpendicular to the first direction regarding their contact portion with adjacent washers being pivoted around an axis parallel to the first direction and extending perpendicular to the first direction, relative to each other for positioning the inner body within the outer body and enabling a transmission of force from the outer body to each inner body in a plurality of directions.

2. A diaphragm system according to claim 1, wherein at least one of the outer body and inner body has a cross-section perpendicular to the first direction of a symmetrical shape.

3. A diaphragm system according to claim 1, wherein each recess has a contact portion for contacting the inner body, said contact portion engaging the inner body in an angular range up to 180° perpendicular to the first direction.

4. A diaphragm system according to claim 1, wherein several inner bodies are positioned in the outer body to extend parallel to one another in the first direction and in a regular angular pattern, each inner body having the same cross-section perpendicular to the first direction and each washer being mounted with different angular orientations relative to said first direction.

5. A diaphragm system according to claim 1, wherein a contact portion of each washer provides for a contact selected from one-point contacts, several-point contacts and line contacts.

6. A diaphragm system according to claim 1, wherein the washers are mounted in pairs with opposite angular orientations in order to balance opposing forces.

7. A diaphragm system according to claim 1, wherein adjacent washers touch each other without being pressed together in the first direction.

8. A diaphragm system according to claim 1, wherein adjacent washers have play between each other, depending on the thickness of the washer in the first direction.

9. A diaphragm system according to claim 1, wherein each washer has a structure selected from an additional hole and an additional cut-out.

10. A diaphragm system according to claim 1, wherein washers are arranged in groups, with the groups being spaced from each other.

11. A diaphragm system according to claim 1, wherein the material of the washer is selected to have a certain thermal expansion resulting in a certain stress applied to the inner body, which stress is dependent on the temperature.

12. A diaphragm system according to claim 1, wherein several inner bodies are positioned in the outer body to extend parallel to one another in the first direction and in a regular angular pattern, each inner body having the same cross-section perpendicular to the first direction, each washer having a recess for each inner body, each recess having a contact portion for engaging the inner body in an angular range up to 180° perpendicular to the first direction and the washer being mounted with different angular orientations relative to said first direction.

13. A diaphragm system for positioning and holding at least one inner body within an outer body, each inner body and outer body extending in a first direction, said system comprising a plurality of washers between the at least one inner body and the outer body, one of the at least one inner body and the outer body having a cross-section perpendicular to the first direction of a non-cylindrical shape, all of the washers having the same shape, each washer having a recess for each inner body, each washer having an outer circumference with at least one contact portion for contacting an inner surface of the outer body over an angular range up to 180° perpendicular to the first direction, the washers being mounted with different relative angular orientation perpendicular to the first direction regarding their contact portion and in at least one sequence with respect to the angular orientation of their contact portions.

14. A diaphragm system according to claim 13, wherein, in one sequence, adjacent washers have equal angular displacement relative to each other.

15. A diaphragm system according to claim 14, wherein the first and last washer of a sequence have the same angular displacement relative to each other as adjacent washers and the first and second washers of adjacent pairs of washers.

16. A diaphragm system according to claim 13, wherein the sequence is adjustable to create one of a selected positioning force and a direct force in certain directions.

17. A diaphragm system for positioning and holding several inner bodies extending parallel to one another within an outer body, each inner body and outer body extending in a first direction, said system comprising a plurality of washers between the inner bodies and the outer body, each inner body having the same cross-section perpendicular to the first direction, one of the inner bodies and the outer body having a cross-section perpendicular to the first direction of a non-cylindrical shape, all of the washers having the same shape, each washer having a recess for each inner body, each recess having a contact portion for engaging the inner body in an angular range up to 180° perpendicular to the first direction, each washer having an outer circumference with at least one contact portion for contacting an inner surface of the outer body over an angular range up to 180° perpendicular to the first direction, the washers being mounted with different relative angular orientation perpendicular to the first direction regarding their contact portion.

* * * * *